(12) United States Patent
Sato

(10) Patent No.: US 11,028,583 B2
(45) Date of Patent: *Jun. 8, 2021

(54) BOARD PANEL

(71) Applicant: Kenichi Sato, Fukuoka (JP)

(72) Inventor: Kenichi Sato, Fukuoka (JP)

( * ) Notice: Subject to any disclaimer, the term of this patent is extended or adjusted under 35 U.S.C. 154(b) by 474 days.

This patent is subject to a terminal disclaimer.

(21) Appl. No.: 15/396,638

(22) Filed: Dec. 31, 2016

(65) Prior Publication Data

US 2017/0107718 A1    Apr. 20, 2017

Related U.S. Application Data

(63) Continuation-in-part of application No. 13/984,162, filed as application No. PCT/JP2012/053208 on Feb. 13, 2012, now Pat. No. 9,644,371.

(30) Foreign Application Priority Data

Feb. 18, 2011    (JP) .............................. JP2011-032993

(51) Int. Cl.
    *B32B 3/24*     (2006.01)
    *E04C 2/32*     (2006.01)
    *E04C 2/24*     (2006.01)
    *E04B 1/86*     (2006.01)
    *E04B 1/94*     (2006.01)
    *E04B 1/84*     (2006.01)
    *B32B 3/26*     (2006.01)

(52) U.S. Cl.
    CPC ............... *E04C 2/328* (2013.01); *E04B 1/86* (2013.01); *E04B 1/94* (2013.01); *E04C 2/243* (2013.01); *B32B 3/266* (2013.01); *E04B 2001/8414* (2013.01); *Y10T 428/24314* (2015.01)

(58) Field of Classification Search
    CPC ........................ B32B 3/266; Y10T 428/24314
    See application file for complete search history.

(56) References Cited

U.S. PATENT DOCUMENTS

2002/0025221 A1 *    2/2002    Johnson ................ E01F 15/086
                                                              404/6

* cited by examiner

*Primary Examiner* — William P Watkins, III
(74) *Attorney, Agent, or Firm* — K&L Gates LLP

(57) ABSTRACT

The present invention is transportable economically in a flat state, and easy to attach and detach, and can provide a curved surface simply while maintaining decoration and strength without craftsmanship and absorb sound. Slits are provided on a rectangular board panel comprising two or more layers of a hard material and a soft material. Two or more layers comprising a hard material and a soft material are laminated on a rectangular board panel, and slits having a length of ½ to ¾ of the vertical side are provided thereto. The use of slits makes formation of curved surfaces easy. Since there is no need to reinforce the outside to maintain the strength thereof, the board panel can be removed easily. Even if an external pressure is applied to the board panel, the flexibility of the hard material divided by the slits and the elastic characteristic of the soft material cause the pressure to be dispersed and absorbed, and sound to be absorbed.

16 Claims, 16 Drawing Sheets

A1: CLOSED CELL FOAM
A2: DIRECTION OF SOUND ENERGY WAVE

B1: OPEN CELL FOAM
B2: DIRECTION OF SOUND ENERGY WAVE

C1: STRAIGHT CONFIGURATION OF BOARD PANEL
C2: RESOURCE OF SOUND ENERGY WAVE
C3: DIRECTION OF SOUND ENERGY WAVE

D1: CONCAVE CONFIGURATION OF BOARD PANEL
D2: RESOURCE OF SOUND ENERGY WAVE
D3: DIRECTION OF SOUND ENERGY WAVE

E1: CONVEX CONFIGURATION OF BOARD PANEL
E2: RESOURCE OF SOUND ENERGY WAVE
E3: DIRECTION OF SOUND ENERGY WAVE

F1: BOARD PANEL WITH OPEN CELL FOAM
F2: MINERAL WOOL INSULATION
F3: WALL OR CEILING

G1: BOARD PANEL WITH OPEN CELL FOAM
G2: MINERAL WOOL INSULATION
G3: AIR CAVITY
G4: WALL OR CEILING

SOUND ABSORPTION

H1: INCIDENT SOUND (SOURCE)
H2: REFLECTED SOUND
H3: TRANSMITTED SOUND

SOUND DIFFUSION

I1: INCIDENT SOUND (SOURCE)
I2: REFLECTED SOUND

*All numbers are in meters. The number at corners denote height of the room.

BOARD PANEL

TECHNICAL FIELD

The present invention relates to a board panel and the sound absorbing property of the board panel for use in furniture components, interior wall, interior ceiling, interior design, and partition wall.

BACKGROUND TECHNOLOGY

A person sometimes wants to have a curved shape on furniture or partition walls. For example, in furniture, a person wants to have a human friendly shape in which the chair seat is fitted to the body, or wants to change the seat shape freely to accommodate the sitting posture. In partition walls, a person wants to have a curved shape, not a flat shape, to reduce acoustic reflections, or for a design friendly to young children and old people (to protect them from injuries from the unexpected wall impact). Additionally, acoustic properties, such as sound absorbing property are considered highly desirable. Further, fire retarding property of the material used in the board panel is desirable when the board panel is used for purpose which fire retardation property is sought such as interior wall of a building.

Wall boards made of plywood or plaster boards cannot have curved surfaces. For this reason, board panels have been bent to provide curved surfaces. Nevertheless, to create a desired shape by bending board panel craftsmanship was required.

In order to solve the problem, Patent Document 1 discloses a board panel on which a curved surface can be formed easily by installing slits that go through the board panel in the side direction on the front and back side surfaces of the board panel body made from a foamed resin, and placing the tips of the front side-slit and the back side-slit more toward the inner part than the center of the board thickness.

However, the board panel disclosed in Patent Document 1 had the following problems: (1) The board panel material is limited only to a foamed resin which provides insufficient strength by itself alone as a construction structure when pressed from the outside; therefore, bent veneers and so on also need to be laminated. (2) Doing so requires much expense in time and effort and craftsmanship. Since the lamination is performed by fixing the outside with bent veneers, the board panel cannot be removed, which is uneconomical. (3) Since slits go through the board panel in the side direction of the board panel, the surface part is a divided rectangle; therefore, even if the front face is made of a hard material such as wood and so on, enough strength cannot be obtained. Patent Document 1: Unexamined Patent Application Publication No. 2009-041302.

DISCLOSURE OF THE INVENTION

Problems the Invention Intends to Solve

The present invention provides a board panel which is transportable economically in a flat state, and easy to attach and detach, and can provide a curved surface simply while maintaining decoration and strength without craftsmanship. The present invention also absorbs sound, providing superior acoustics to where the board panel is placed or installed.

Means to Solve the Problems

The present invention is a board panel with a rectangular top characterized in that it has two or more stacked layers comprising a hard material and a soft material; wherein the front face layer is a layer of a hard material in which slits are provided in parallel with the vertical side of said rectangle; said slits have a length of ½ to ¾ of said vertical side, and one end thereof touches the horizontal side of said rectangle; and said slits include one type in which one end thereof touches the upper horizontal side of said rectangle (upper slit) and the other type in which one end thereof touches the lower horizontal side of said rectangle (lower slits).

Here, the "hard material" means the material for which it is difficult to obtain a desired curvature by pressure deformation. Many hard materials such as wood, metal, plastic, and so on are included in the hard materials.

The "soft material" means the material for which it is easy to obtain a desired curvature by pressure deformation. The soft material includes rubber, many soft synthetic resins and so on. Further, the soft material has elasticity to absorb the pressure (the pressure generated by the weight of a person, for instance, for use in a chair-seat) applied to the surface of the board panel.

For the board panel to provide sound absorbing property, it is desirable that the soft material to be of foam type material. Further it more desirable for the foam type material to have open cells to provide sound absorbing property. The open cell foam type materials are made of materials such as melamine foam and polyurethane foam. However, the open cell foam type material may have lower tensile strength when compared to foam type material with closed cell. For the open cell foam type material to be used for board panel, it is desirable to have a tensile strength of more than 75 kPA and to have a density of more than 90 kg/m$^3$.

The "slit" means a band (a line having a width) of groove toward the inside the board panel when viewed from the outside of the board panel.

Slits go through the hard material. Further, since slits have a length of ½ to ¾ of the vertical side and are in the form of upper slits and lower slits, the rectangle has slits on any lines that are in parallel with the horizontal sides of the rectangle; therefore, a curvature can be formed easily in the horizontal direction of the rectangle in the similar manner as Patent Document 1.

The slits have a length of ½ to ¾ of the vertical side. Any line having a length of ½ or more that is in parallel with the horizontal side intercepts with slits. A curvature can be formed in the direction of the horizontal side of the board panel. The length is ¾ or less and does not go through the vertical side. As a result, the board panel of the present invention does not face the drawback of sacrificing strength of the board panel disclosed in Patent Document 1. Depending on the application, partial strength enhancement can be made by laminating materials such as veneer, etc. on the stretched surface of plywood, etc. For instance, when used in a chair, considering that the maximum pressure is applied to the seat part, the strength enhancement specific to the seat section may be considered. This may provide different elasticity, sensation, and so on for the sitting person. There is no need for reinforcing the externality, which makes attachment and detachment thereof easy.

The slits also provide an open space on the surface of the board panel where the front surface is absent. The amount of the open space provided by these slits compared to the entire surface of the board panel is also important in providing the amount of sound absorption desired. Generally, the amount of sound absorbed increases when the amount of open space increases. However, with more open area, the strength of the board panel decreases. The ideal amount of open area by the slits with both board panel strength and sound absorption is between 15% to 40% of the surface area of the board panel.

In addition to the board panel having sound absorption property, it is also desirable for the material used in the board panel, both the wood and the soft material, to have fire retarding property.

Since the board panel is not separated by slits, they may be formed to pass through the board panel. Naturally, slits may have the depth up to the middle point of the board panel rather than passing therethrough.

Anything may be used for the hard material of the front face layer as long as slits pass through the front face of the layer. Any materials including wood, metal, and so on may be selected optionally to render a decorative board panel.

The board panel of the present invention is characterized in that said upper slits and said lower slits are arranged alternately.

By alternating the upper slits and lower slits, gaps between slits are made smaller also near the upper side or lower side, thereby making the formation of a curvature easy.

Furthermore, the smaller gaps between slits separate the hard material on the front face to a slim shape. The hard material on the front face deforms in such a way that each separate slim shape deforms to disperse and absorb the pressure in response to the pressure applied to the front face of the board panel. Even if the pressure applied to one slim part is transmitted to adjacent slim parts as stress, it will be a small stress. This makes the probability of damaging the hard material on the front face due to the pressure applied thereto become small.

The board panel of the present invention is characterized in that said slits are spaced 5 mm or more on the straight line connecting the middle points of said vertical sides while said slits are spaced 40 mm or less on said horizontal sides.

In order to strengthen each of the slim parts, it is preferable that slits be spaced 5 mm or more on the straight line connecting the middle points of the vertical side. In order to reduce the probability of damaging the slim shape due to the internal stress, it is preferable that said slits be spaced 40 mm or less on said horizontal side.

The board panel of the present invention is characterized in that said front face layer is a wood layer and said vertical side is in the direction of wood grain of the wood.

The use of wood for the front face layer provides the wood texture-based decorativeness.

When a piece of wood is given a slim shape, the wood grain kept in the elongated direction reduces the probability of damaging it due to deformation. Since slits are formed in parallel with the vertical sides, when the vertical sides become the sides in the direction of wood grain, the parts having a slim shape are elongated in the direction of wood grain. However, there is no need for the "side in the direction of wood grain" to be strictly in parallel with wood grain. In the vertical direction or the horizontal direction of the rectangular board, the side closer to wood grain may be selected.

The present invention is a board panel with a rectangular top characterized in that it has three or more stacked layers comprising a hard material and a soft material; wherein said board panel comprises the first hard material layer on the front face, a soft material layer (middle soft material layer) which touches said first hard material layer; and the second hard material layer which is more toward the rear face side than said middle soft material layer; layers other than said first hard material layer and the second hard material layer are soft material layers; slits (front face-side slits) are formed in parallel with the vertical side of said rectangle on said first hard material layer of said board panel; said front face-side slits have a length of ½ to ¾ of the length of said vertical side, and one end thereof touches the horizontal side of said rectangle while the depth thereof reaches said middle soft material layer but does not reach said first hard material layer; said two or more front face-side slits include the type in which one end thereof touches the upper horizontal side of said rectangle (upper front face slits) and the other type in which one end thereof touches the lower horizontal side of said rectangle (lower front face slits); two or more slits (rear face-side slits) that are in parallel with the vertical side of said rectangle are provided on the rear face-side of said board panel; said rear face-side slits have a length of ½ to ¾ of that of said vertical side, and one end thereof touches the horizontal side of said rectangle while the depth thereof goes through said second hard material layer but does not reach said first hard material layer; said two or more rear face-side slits include the type in which one end thereof touches the upper horizontal side of said rectangle (upper rear face slits) and the other type in which one end thereof touches the lower horizontal side of said rectangle (lower rear face slits); and said front face-side slits and said rear face-side slits are arranged alternately.

The slits formed on each of the front and rear faces and arranged alternately prevent themselves from overlapping in the thickness direction of the board panel, thereby enhancing the overall strength thereof.

Furthermore, the overall strength of the board panel can also be enhanced by introducing a thin material such as a fabric and so on containing a lattice of fibers for the middle soft material layer.

Depending on the application, partial strength enhancement can be made by laminating materials such as veneer, etc. on the stretched surface of plywood, etc. For instance, when used in a chair, considering that the maximum pressure is applied to the seat part, the strength enhancement specific to the seat section may be considered. This may provide different elasticity, sensation, and so on for the sitting person.

The shape of slits on the front face side and the rear face side viewed from the outside the board panel is the same as that of the above.

Since the front face-side slits go through the layer of the first hard material, and the rear face-side slits go through the layer of the second material, both of the hard material layers can form a curvature, thereby enabling the entire board panel to be curved.

The board panel of the present invention is characterized in that said upper front face slits and said lower front face slits are arranged alternately, and said upper rear face slits and said lower rear face slits are arranged alternately.

The board panel of the present invention is characterized in that said front face-side slits and said rear face side-slits are spaced 5 mm or more on the straight line connecting the middle points of said vertical sides, and said front face side-slits and said rear face side-slits are spaced 40 mm or less on said horizontal side.

The board panel of the present invention is characterized in that said first hard material layer and said second hard material layer are wood layers, and said vertical side thereof is in the direction of wood grain.

The board panel of the present invention is characterized in that said second hard material layer is the rear face layer.

Both layers on the front face and the rear face become hard material layers. In the application in which both the front and rear faces are exposed, the hard material layers alone are exposed, and, for instance, decoration stemming from the hard material layer of wood can be attained.

The board panel of the present invention is characterized in that it comprises a face (middle plane) between the front face and the rear face of said board panel wherein it does not contain any of said front face side-slits and said rear face side-slits between the tip of said front face side-slits and the tip of said rear face side-slits.

The overall strength of the board panel can also be enhanced by the use of the slit-free middle plane. There is no hindrance for the board panel to form a curved surface even if slits are not formed, as long as the middle plane is a soft material.

Effects of the Invention

Since the present invention is a board panel which can provide a curved surface easily and maintains decorativeness and strength, it can be utilized for wall surfaces, furniture, and so on.

Furthermore, as a raw material to make furniture having curved surfaces of various shapes such as chairs, one type of standardized board panel can be used to form curved surfaces of various shapes, thereby saving time required for selecting board panel.

WORKING EXAMPLES

The present invention is described herein with reference to working examples.

Working Example 1

Figure 1:
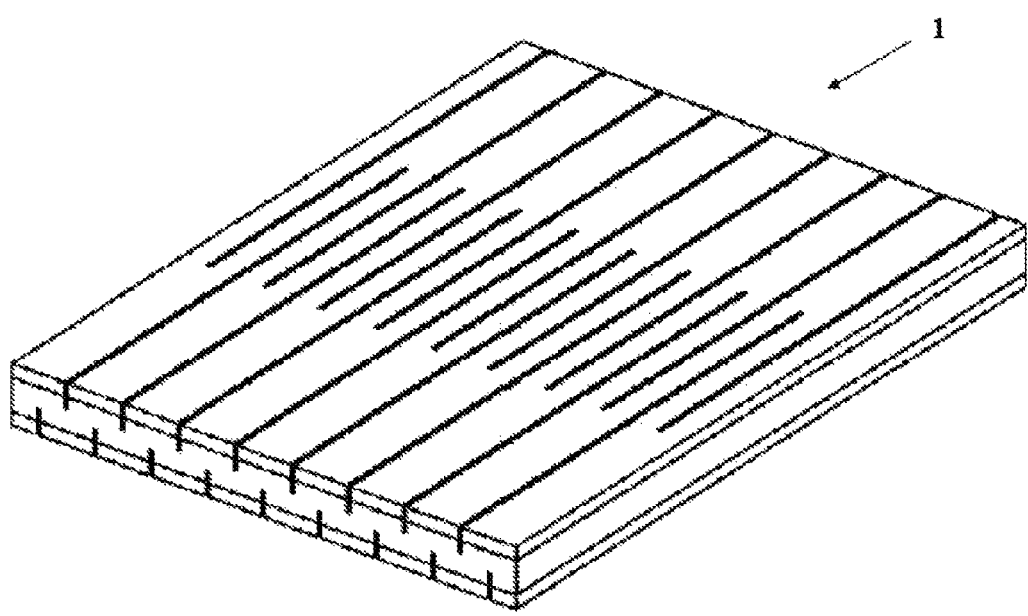
FIG. 1 is a perspective view illustrating an example of the board panel of the present invention.

FIG. 1 is a perspective view illustrating an example of the board panel of the present invention.

Figure 2:
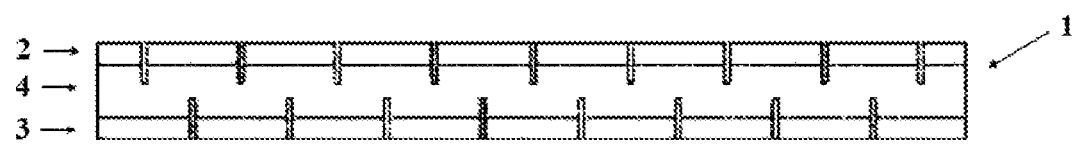
FIG. 2 is a diagram illustrating the side view of the board panel.

As illustrated in FIG. 2, in board panel 1, front face hard material layer 2, rear face hard layer 3 and soft material layer 4 are adhered and laminated. Front face hard material layer 2 and rear face hard layer 3 are made of plywood, and soft material layer 4 is made of a synthetic resin (PE 30).

Figure 3:
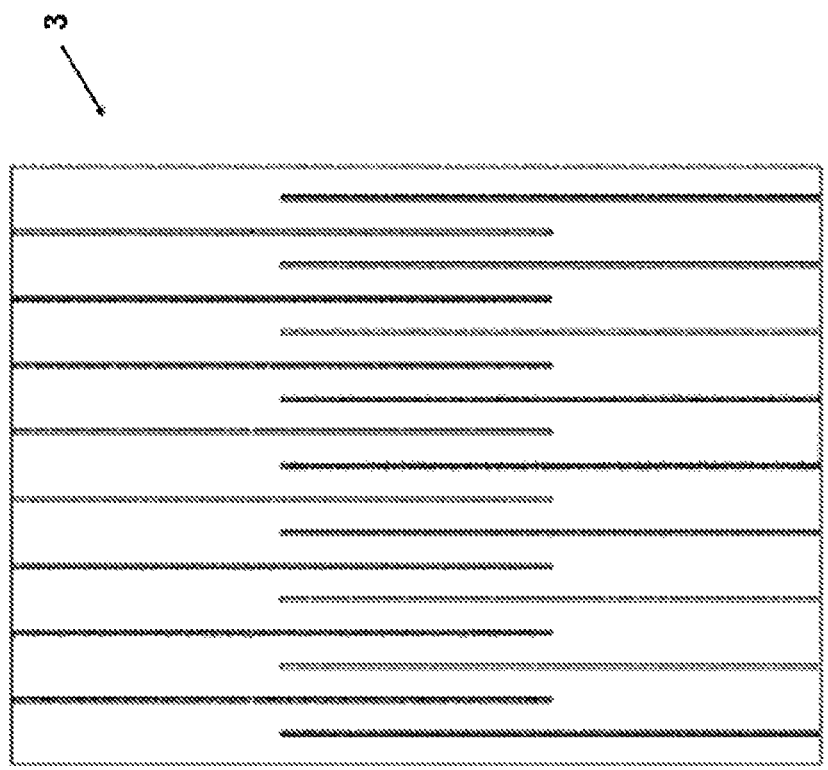
FIG. 3 is a plan view illustrating the board panel.
Figure 4:
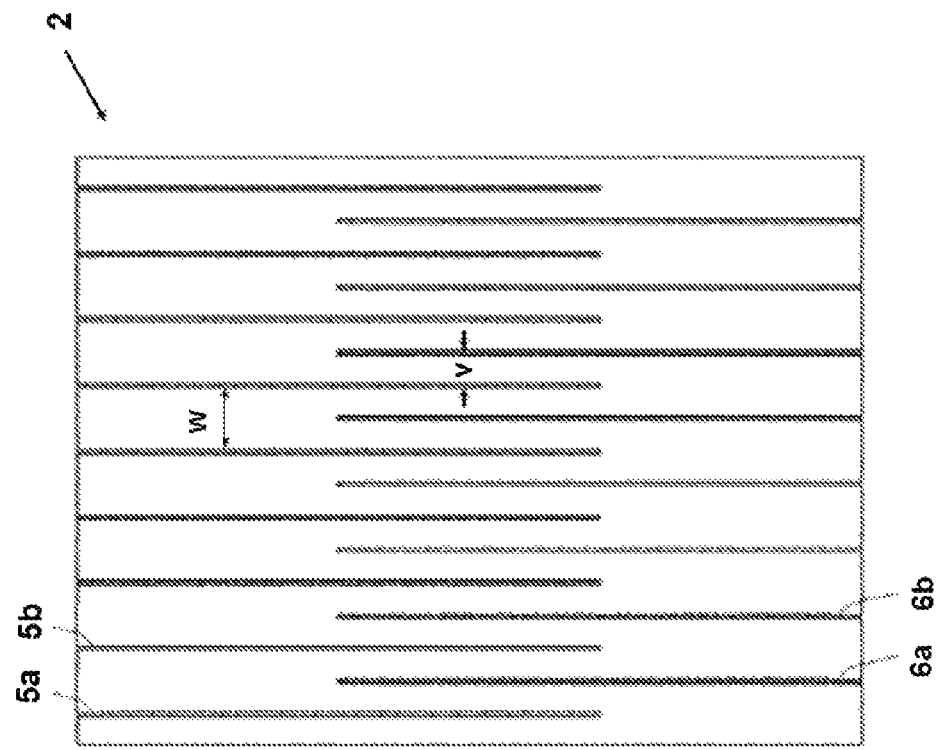
FIG. 4 is a bottom view of the board panel.

FIG. 3 is a plan view of the board panel. FIG. 4 is a bottom face view of the board panel.

The plywood that constitutes hard material layer 2 and rear face hard layer 3 has wood grain in the vertical direction of FIGS. 3 and 4. Furthermore, in the external rectangle of FIGS. 3 and 4, the side drawn vertically in the figure is the vertical side, and the side drawn horizontally is the horizontal side.

As illustrated in FIG. 3, equally-spaced upper slits 5a, 5b, . . . and the equally spaced lower slits 6a, 6b, . . . are provided alternately. The space of slits (referred to as "v") of the area in which both upper slits and lower slits exist is 6 mm, and the space of slits (referred to as "w") of the area in which only upper slits exist and the area in which only upper slits exist is 12 mm.

As illustrated in FIG. 2, the front face is provided with slits at different locations from those of the rear face of board panel 1, and slits in FIG. 3 are provided at different locations from those in FIG. 4. Slits of the board panel do not overlap with each other in the thickness direction, and the overall strength of the board panel can be reinforced.

Figure 5:
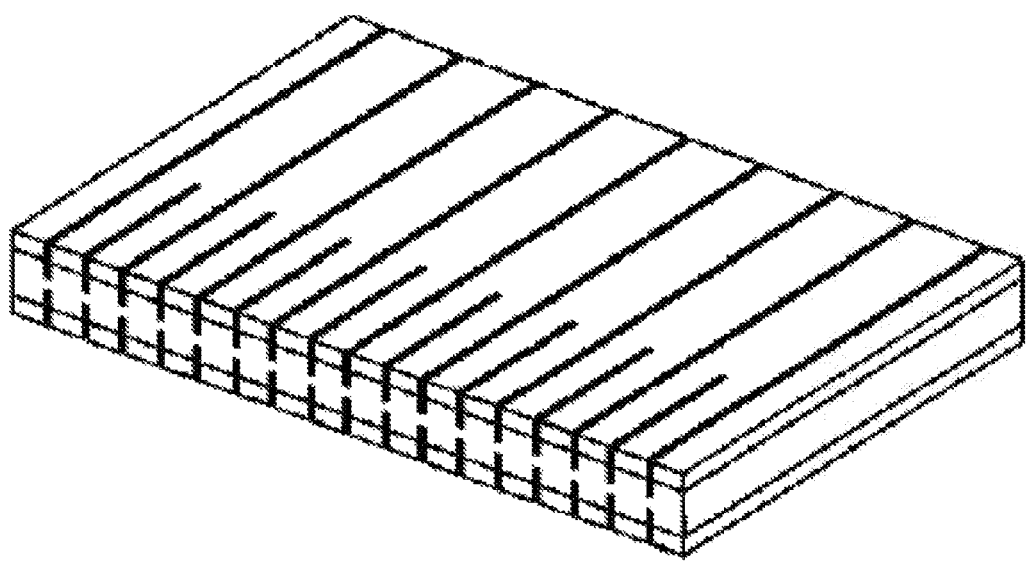
FIG. 5 is a diagram showing one half of the board panel.
Figure 6:
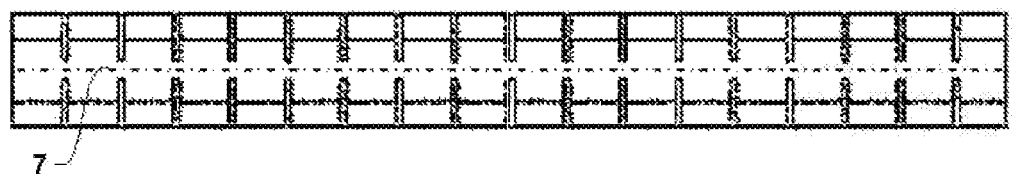
FIG. 6 is a cross-sectional view of the board panel.

FIG. 5 is a diagram illustrating a half of the board panel. It shows only one half of the inner part in FIG. 1. FIG. 6 is a cross-sectional view of the board panel. It shows the side view thereof in FIG. 5, and the cross-sectional view cut out in the center section in FIG. 1.

As illustrated in FIGS. 2 and 6, board panel 1 has slits having a depth which does not reach the center thereof, and has middle plane 7 which does not have slits between the front face and rear face. Middle plane 7 enhances the strength of the board panel. Moreover, the middle plane is shown with one-dotted line in FIG. 6; however, this does not mean that there is an article in reality. Middle plane 7 is a part of soft material layer 4.

Figure 7:
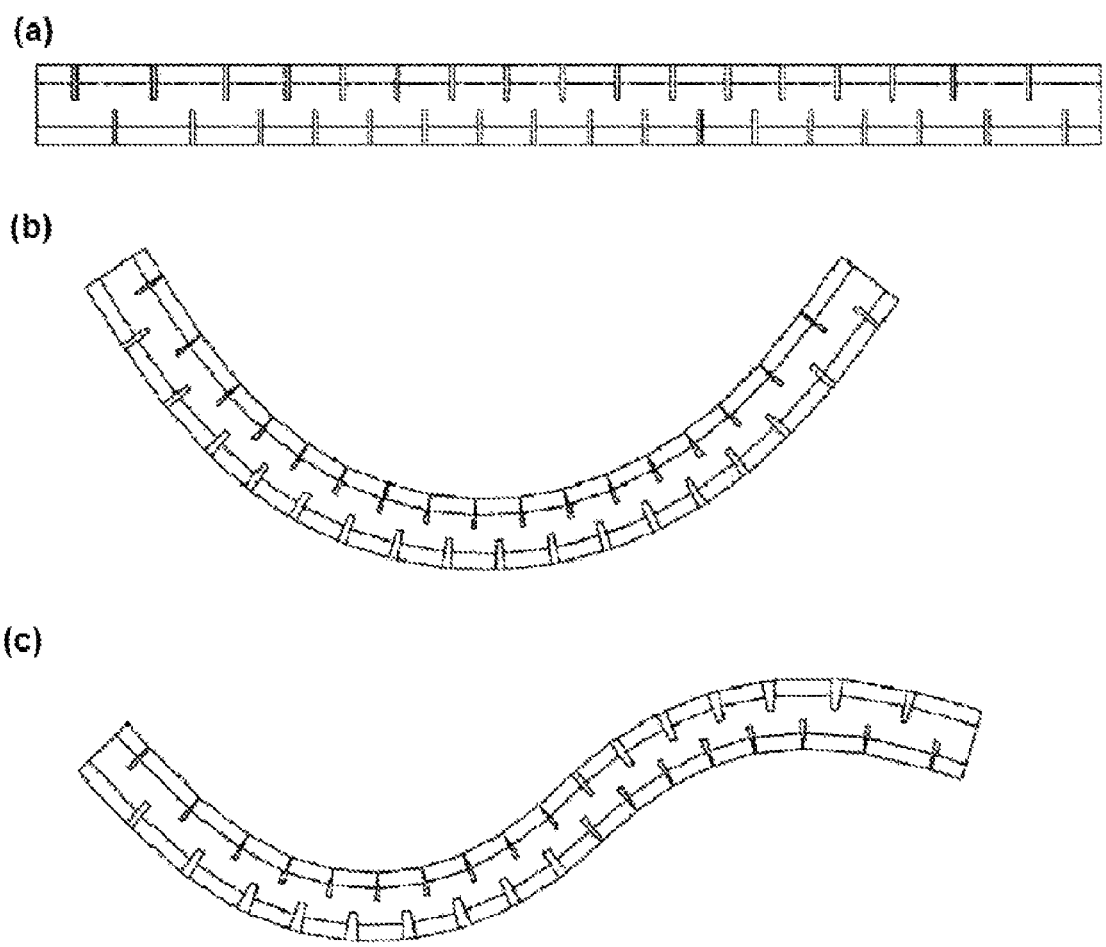
FIG. 7 is a diagram illustrating an example of the state in which a curved surface is formed.

FIG. 7 is a diagram showing an example of a state in which a curved surface is formed. Figure (a) illustrates the flat state. By the use of slits, curved surfaces having the shapes as illustrated in Figures (b) and (c) can be formed. The middle plane section has no slit but deforms along the curved surface because it is a soft material.

Figure 8:
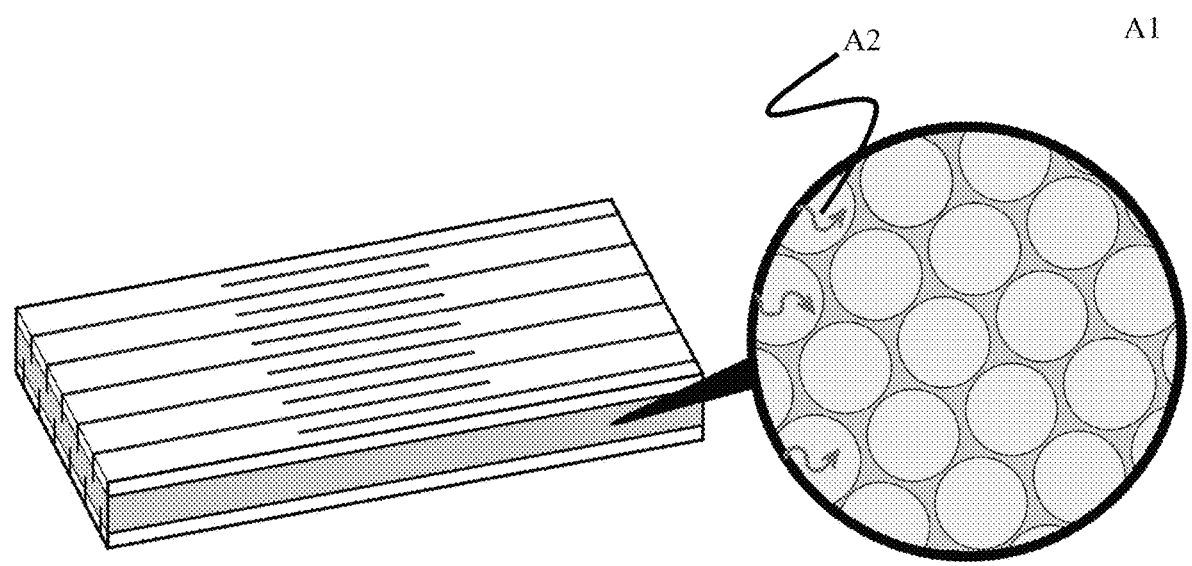
FIG. 8 is an illustrative example of sound energy wave traveling into/through board panel with closed cell foam.
Figure 9:
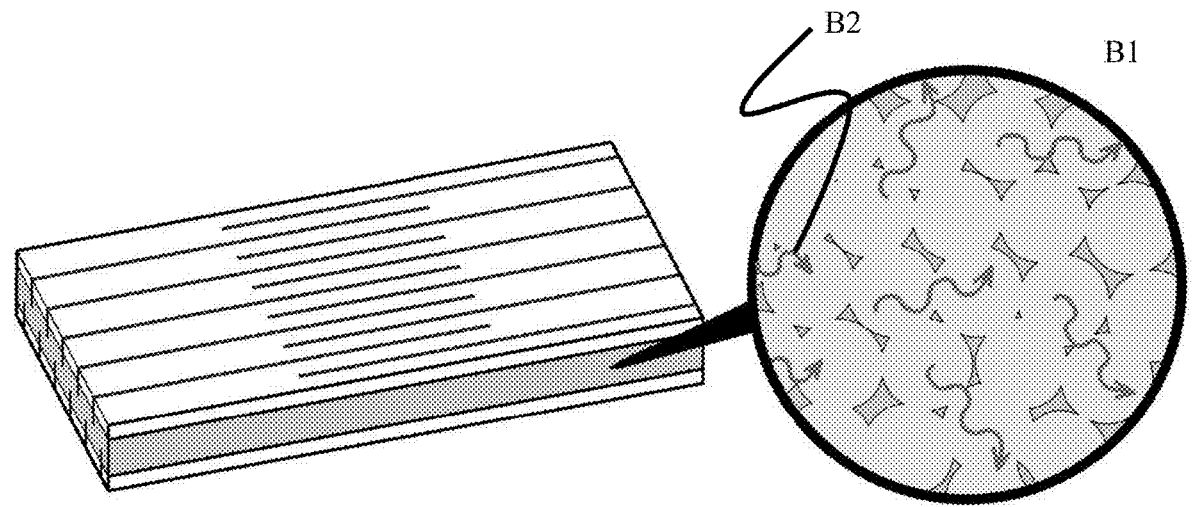
FIG. 9 is an illustrative example of sound energy wave traveling into/through board panel with open cell foam.

FIG. 8 shows an example of a board panel with the soft material layer having closed cell formation. The magnified section of the soft material shows an example of how a sound energy wave may travel once it enters the board panel through the soft material with closed cell formation. On the other hand, FIG. 9 shows an example of a board panel with the soft material layer having open cell formation. The magnified section of the soft material shows an example of how a sound energy wave may travel once it enters the board panel.

Figure 10:
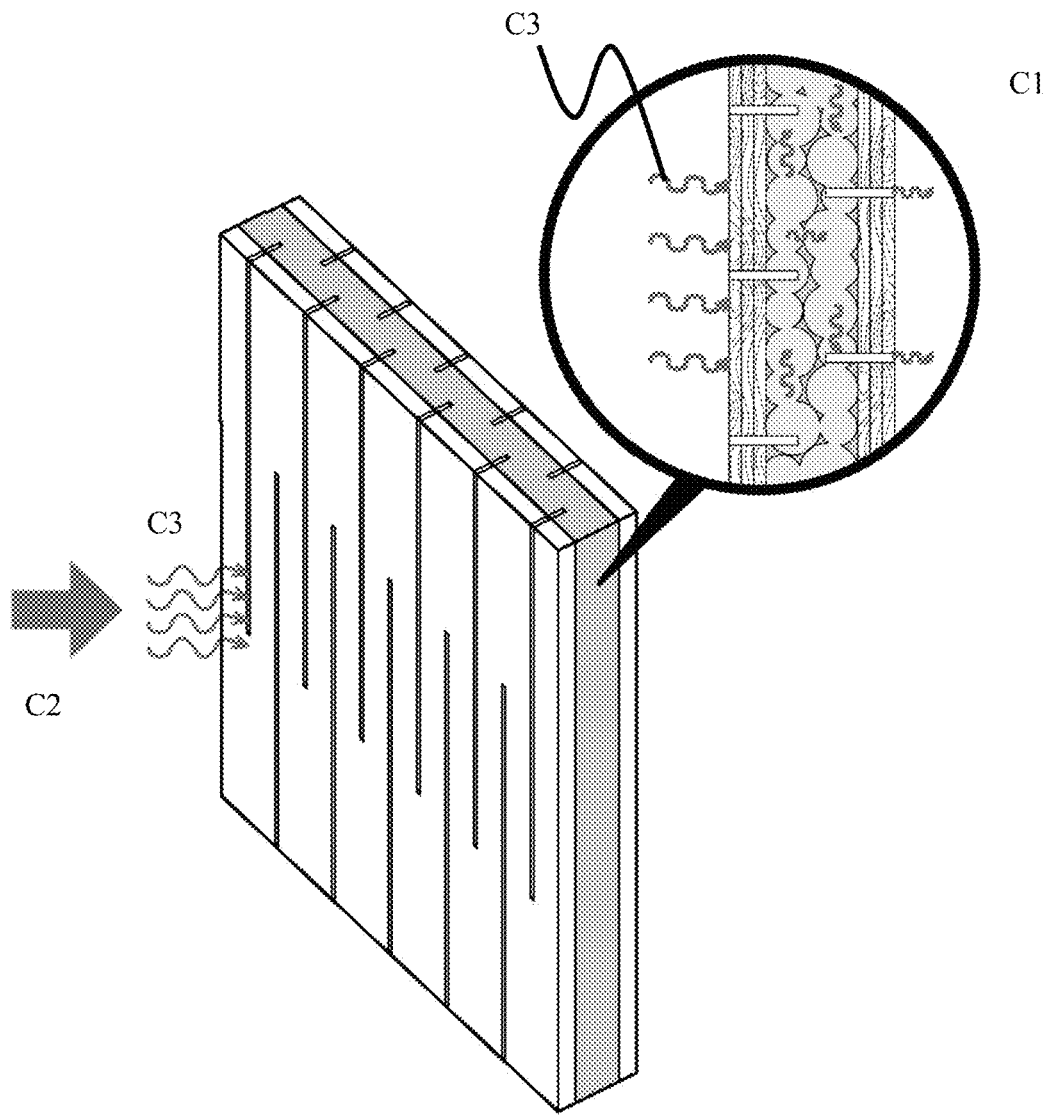
FIG. 10 is an illustrative example of sound wave traveling into/through board panel in straight configuration.
Figure 11:
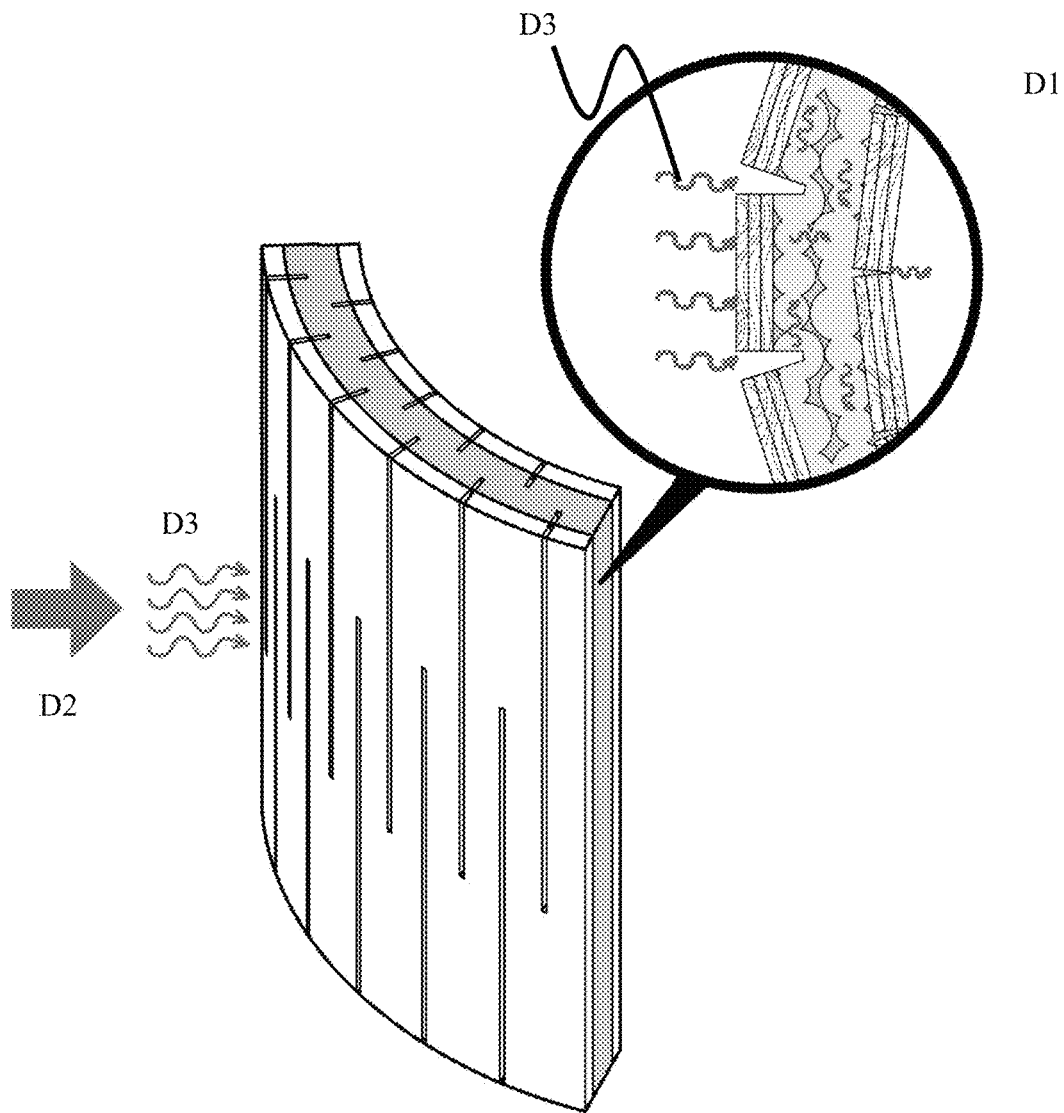
FIG. 11 is an illustrative example of sound wave traveling into/through board panel in concave configuration.
Figure 12:
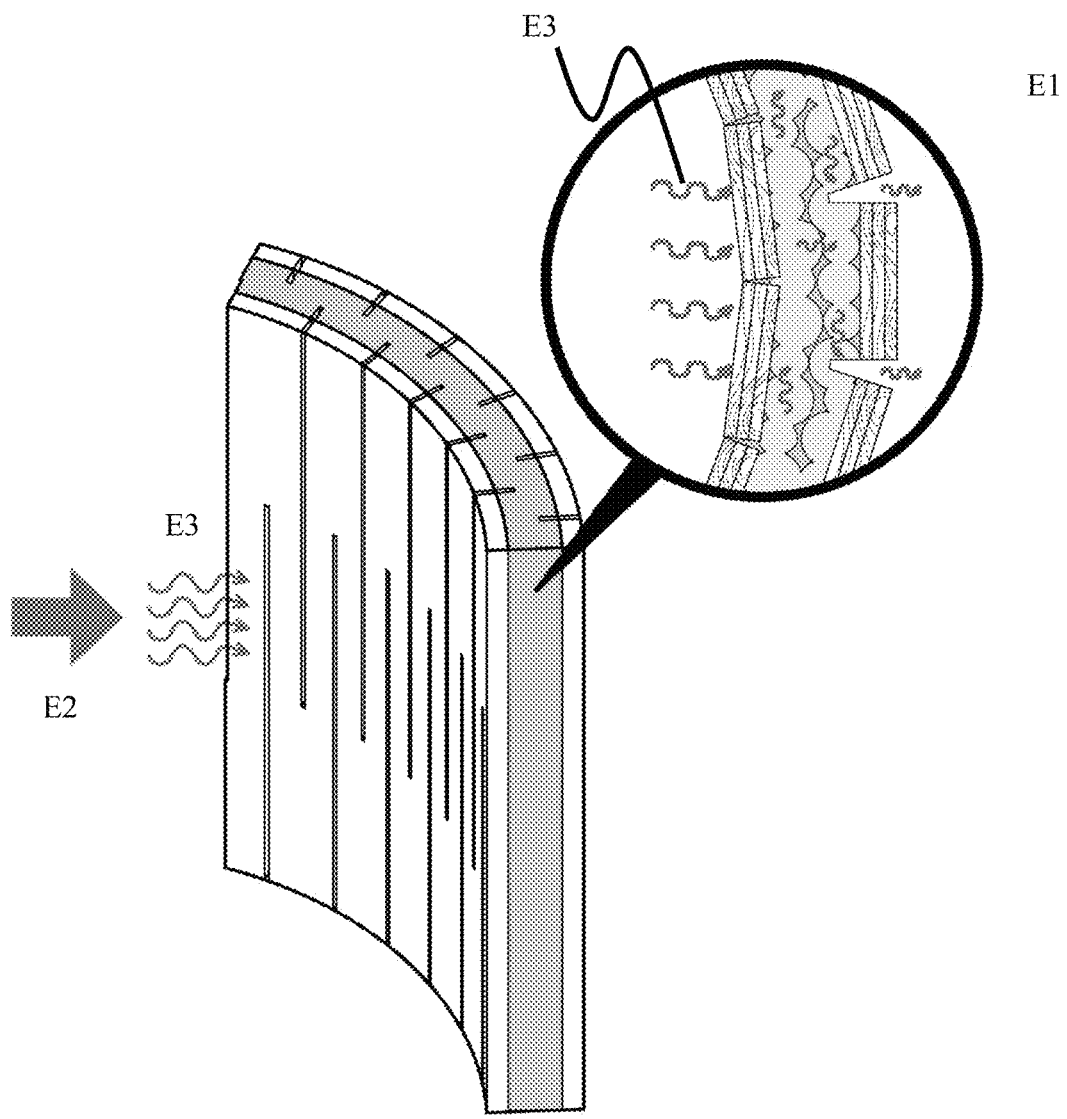
FIG. 12 is an illustrative example of sound wave traveling into/through board panel in convex configuration.

FIG. 10 shows an example of a board panel set up as a straight board panel. The drawing also shows how a sound energy wave may be stopped by the board panel's outer surface, how a sound energy wave may enter the board panel through a slit, and how the sound energy wave may travel through the soft material layer of a board panel. FIGS. 11 and 12 show a similar example of a board panel and its relationship with the sound energy wave which the board panel is bent so it is concave in FIG. 11 and convex in FIG. 12 relative to the direction of the traveling sound energy wave.

Figure 13:
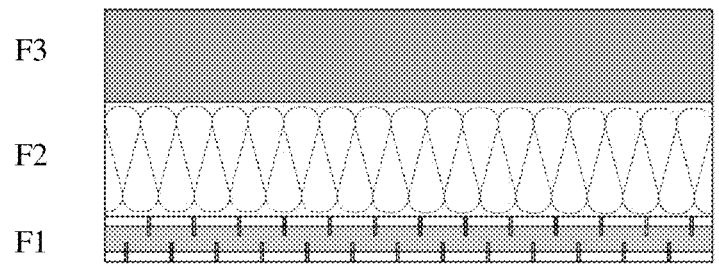
FIG. 13 is an illustrative example of a cross sectional view of the board panel with open cell foam, mineral wool insulation and base wall or ceiling.
Figure 14:
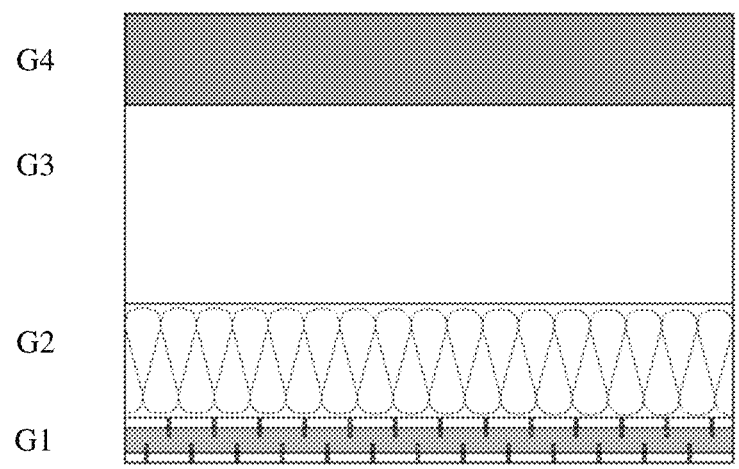
FIG. 14 is an illustrative example of a cross-sectional view of the board panel with open cell foam, mineral wool, air cavity, and base wall or ceiling.

FIG. 13 is an illustrative example of a cross sectional view of the board panel in straight configuration with open cell foam, and mineral wool insulation placed between the board panel and the wall or the ceiling. FIG. 14 shows a similar set up to FIG. 13 but it includes a layer of air cavity between the base wall or ceiling and the mineral wool insulation.

Figure 15:
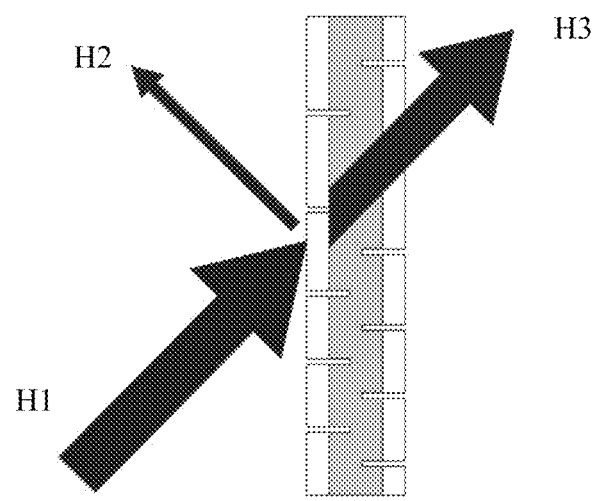
FIG. 15 is an illustrative example of sound absorption, sound reflection and transmitted sound.
Figure 16:
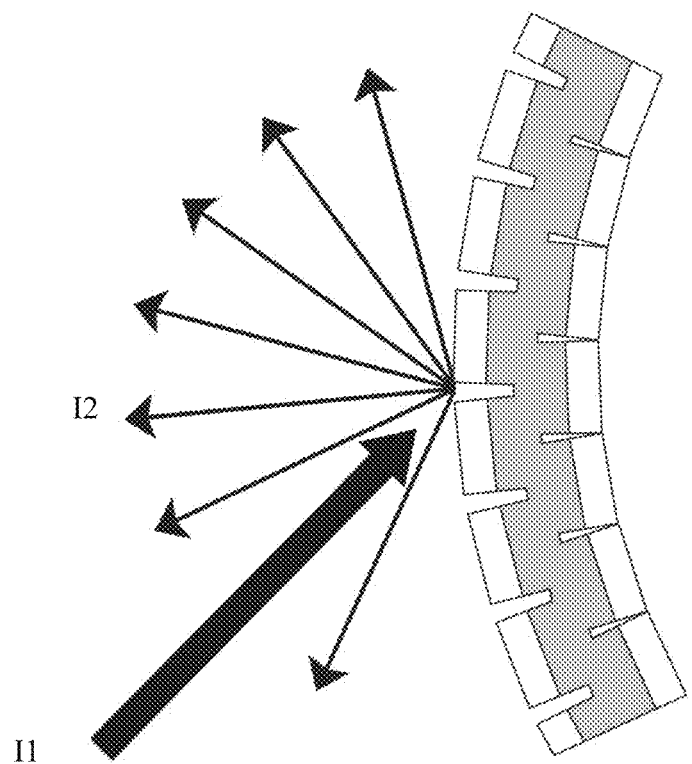
FIG. 16 is an illustrative example of sound diffusion.

FIG. 15 is an illustrative example of sound absorption, sound reflection and transmitted sound energy wave where the board panel is in a flat straight configuration. FIG. 16 shows how sound energy wave may be diffused by a board panel.

Figure 17:
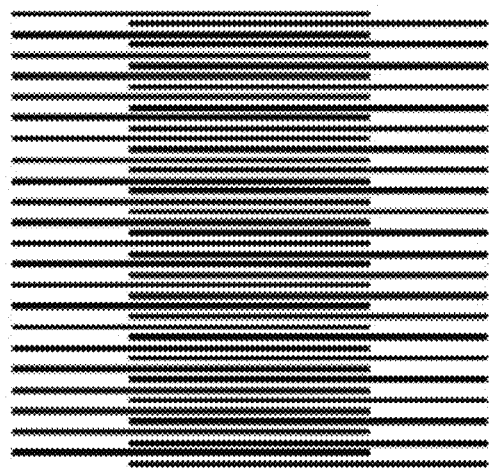
FIG. 17 is an illustrative example of open area of a board panel and width of the slits.
Figure 17:
Figure 17:
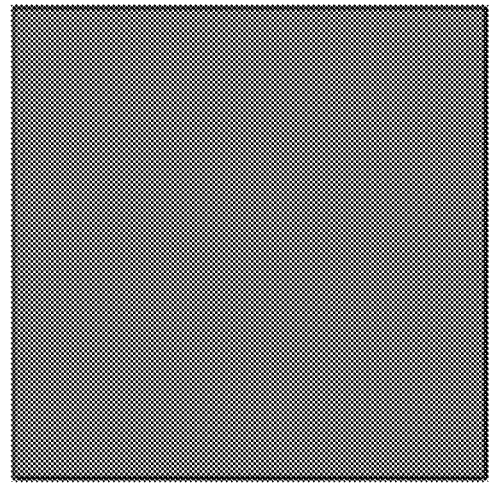

FIG. 17 shows how the surface area of the board may be covered with slits and shows how the width and the frequency or the interval of the slits result in different amount of area to be considered an open area or in other words, area covered with slits. The board panel tends to weaken with increasing open area although the acoustic property of absorbing sound increases with the amount of open area. An ideal ratio of open area to the entire surface area so the acoustic quality is good while maintaining strength is between 15% to 45%.

Figure 18:
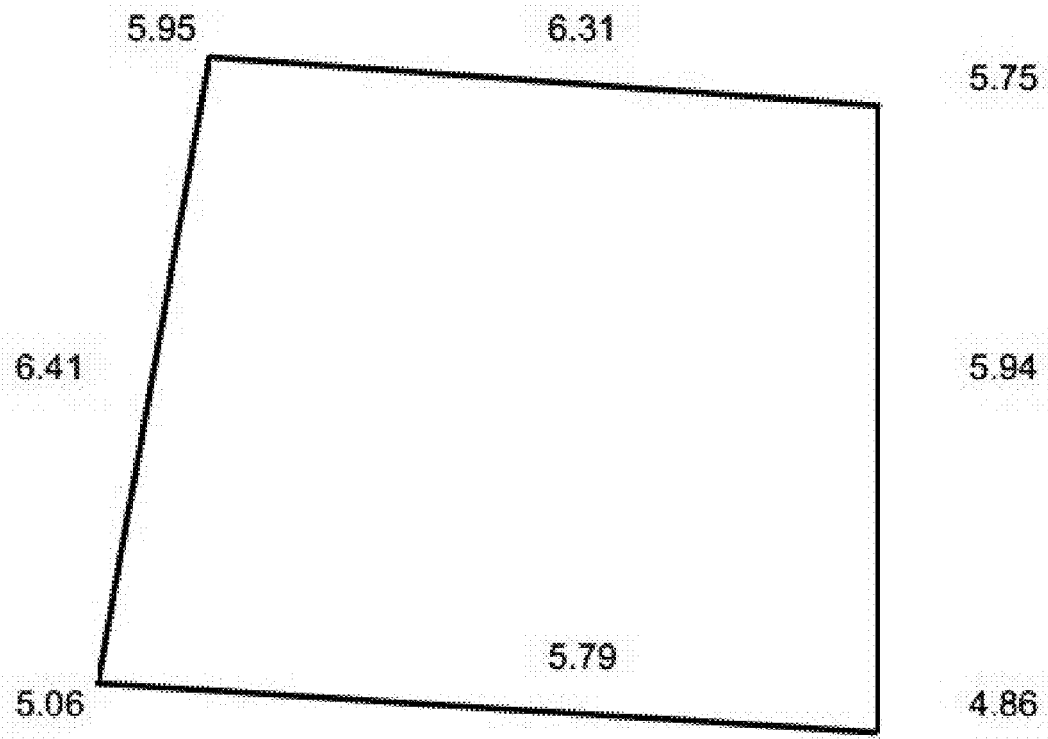
FIG. 18 is the dimension of the reverberation room used for acoustic testings.

FIG. 18 is the dimension of the reverberation room used for acoustic testing. All numbers are in meters and the numbers on the four corners are the height of the room at each of the corners.

Figure 19A:
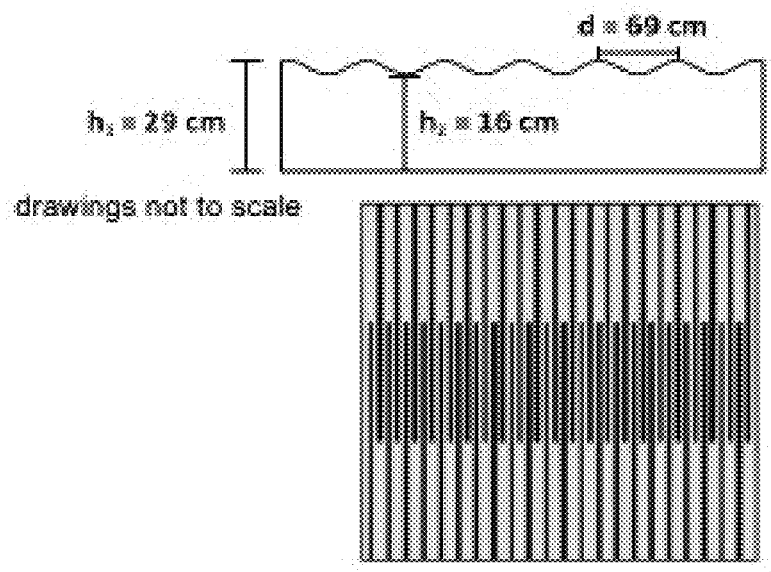
FIG. 19A shows the overview of first set up of the board panel specimen tested and 19B shows the result of the testing.
Figure 19B:
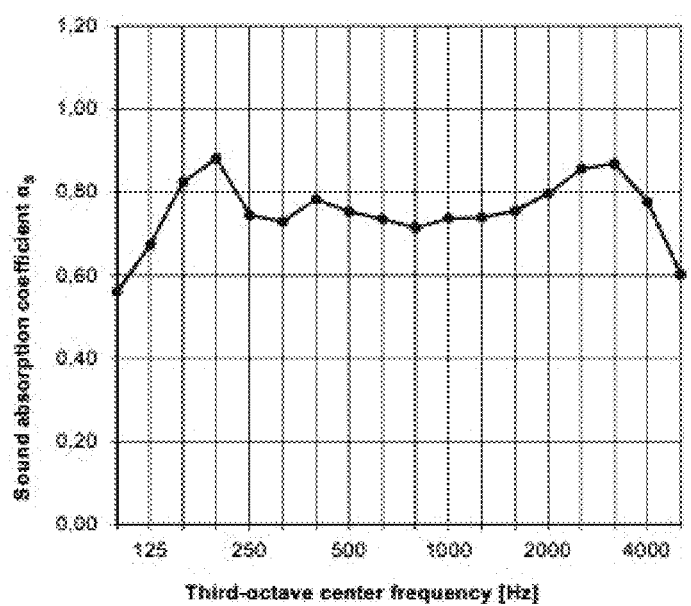
Figure 20A:
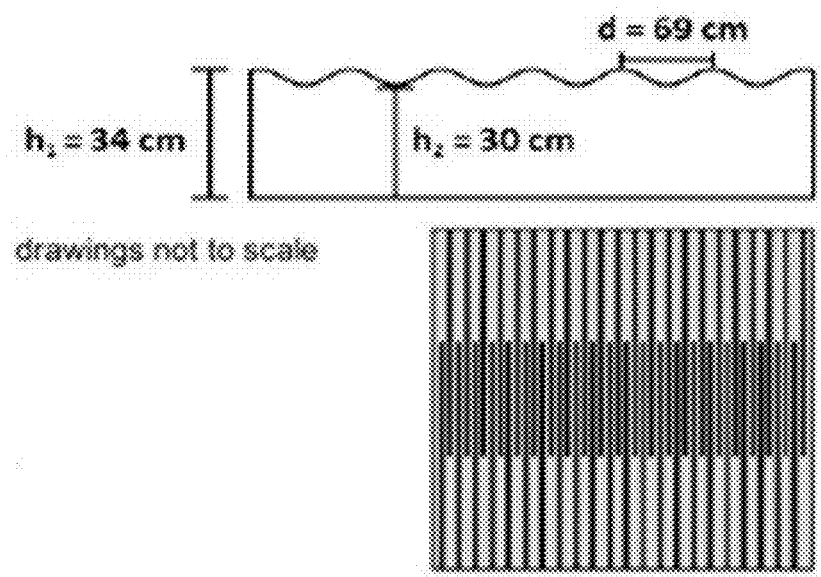
FIG. 20A shows the overview of second set up of the board panel specimen tested and 20B shows the result of the testing.
Figure 20B:
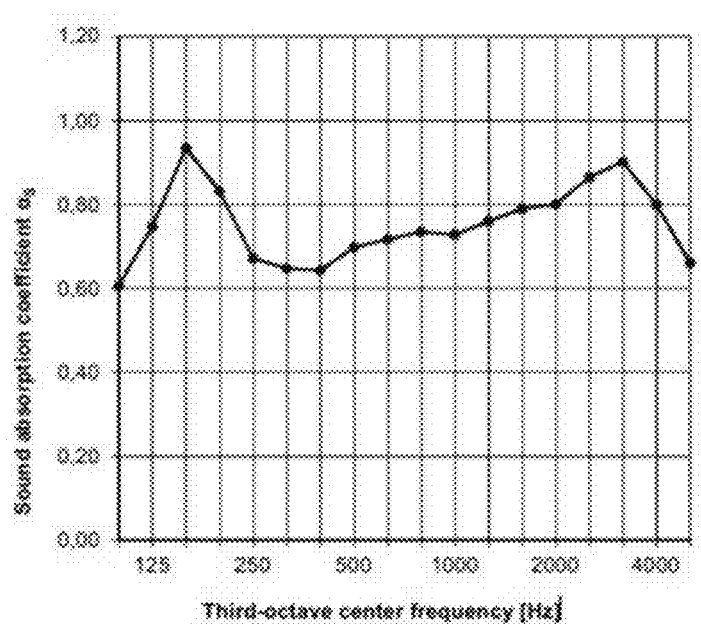

FIGS. 19A and 20A shows the overview of the tested specimen and 19B and 20B shows the result of the testing.

INDUSTRIAL APPLICABILITY

Since the present invention is a board panel which can provide a curved surface simply while maintaining decoration and strength, and one type of standardized board panel can be used to form curved surfaces of various shapes, it can expect utilization by furniture manufacturers, construction companies, and so on.

Acoustic Property—Sound Absorption

The board panel was tested for sound absorption. The testing was conducted in accordance with DIN EN ISO 354 standard. The curved board was tested in two different set up.

In the first set up, the board panel was formed into a curved surface in front of a cavity of 160-290 mm with 100-150 mm of mineral wool insulation. The wooden board was curved to form a radius of 200 mm. The wooden board of the board panel tested had slots width of 1.6 mm before curving and two wooden board sandwiched a polyurethane foam. The total thickness of the board panel was 19 mm and the total area tested were 12 m².

In the second set up, the board panel was formed into a curved surface in front of a cavity of 300-340 mm with 150 mm of mineral wool insulation. The wooden board was curved to form a radius of 600 mm. The wooden board of the board panel tested has slots width of 1.6 mm before curving and two wooden board sandwiched a polyurethane foam. The total thickness of the board panel was 19 mm and the total area tested were 12 m².

The temperature in the reverberation room was approx. 22° C.; the air humidity was approx. 45%. The atmospheric air pressure was approx. 1007 hPa. The test specimens were inserted into a frame laying on the floor of the reverberation room.

The following test and measuring equipment were used:
Hand-held sound level meter type Norsonic Nor 140 (channel 1)
Hand-held sound level meter type Norsonic Nor 140 (channel 2)
Microphone type Norsonic Nor 1225 (channel 1)
Microphone type Norsonic Nor 1225 (channel 2)
Microphone preamplifier type Norsonic Nor 1209 (channel 1)
Microphone preamplifier type Norsonic Nor 1209 (channel 2)
Power amplifier type Norsonic Nor 280
Dodecahedron loudspeaker type Norsonic Nor 276
Acoustic calibrator type Norsonic Nor 1251

The following standards were applied for testing and assessing the measurement results.

/1/ DIN EN ISO 354, Edition December 2003 "Akustik; Messung der Schallabsorption in Hall-räumen"—Acoustics—Measurement of sound absorption in a reverberation room /2/ ISO 9613, Part 1, Edition June 1993 "Acoustics—Attenuation of sound during propagation outdoors—Calculation of the absorption of sound by the atmosphere"

/3/ DIN EN ISO 11654, Edition July 1997 "Akustik; Schallabsorber für die Anwendung in Gebäuden—Bewertung der Schallabsorption"—Acoustics—Sound absorbers for use in buildings—Rating of sound absorption Test Results

TABLE 1

| | Absorption coefficient $\alpha_s$ | | | |
|---|---|---|---|---|
| Third-octave center frequency octave center frequency [Hz] | First Set Up at radius 200 mm in front of a cavity of 160-290 mm with 100-150 mm mineral wool insulation | | First Set Up at radius 200 mm in front of a cavity of 160-290 mm with 100-150 mm mineral wool insulation | |
| | in third-octaves | Averaging in octaves | in third-octaves | Averaging in octaves |
| 100 | 0.56 | 0.69 | 0.61 | 0.76 |
| 125 | 0.67 | | 0.75 | |
| 160 | 0.82 | | 0.93 | |
| 200 | 0.88 | 0.78 | 0.83 | 0.72 |
| 250 | 0.74 | | 0.67 | |
| 315 | 0.73 | | 0.65 | |
| 400 | 0.78 | 0.76 | 0.64 | 0.69 |
| 500 | 0.75 | | 0.70 | |
| 630 | 0.73 | | 0.72 | |
| 800 | 0.71 | 0.73 | 0.74 | 0.74 |
| 1000 | 0.74 | | 0.73 | |
| 1250 | 0.74 | | 0.76 | |
| 1600 | 0.75 | 0.80 | 0.79 | 0.82 |
| 2000 | 0.80 | | 0.80 | |
| 2500 | 0.86 | | 0.86 | |
| 3150 | 0.87 | 0.75 | 0.90 | 0.79 |
| 4000 | 0.78 | | 0.80 | |
| 5000 | 0.60 | | 0.66 | |

| | Average reverberation times T [s] | | |
|---|---|---|---|
| Third-octaves center frequency | empty | First set up with radius 200 mm in front of a cavity of 160-290 mm with 100-150 mm mineral wool insulation | Second set up (radius 600 mm) in front of a cavity of 300-340 mm with 150 mm mineral wool insulation on average |

TABLE 1-continued

| | | | |
|---|---|---|---|
| 100 | 8.54 | 3.07 | 2.91 |
| 125 | 8.73 | 2.73 | 2.54 |
| 160 | 8.90 | 2.38 | 2.17 |
| 200 | 7.84 | 2.19 | 2.28 |
| 250 | 7.30 | 2.41 | 2.58 |
| 315 | 7.17 | 2.43 | 2.63 |
| 400 | 7.98 | 2.39 | 2.74 |
| 500 | 7.80 | 2.44 | 2.57 |
| 630 | 6.95 | 2.39 | 2.43 |
| 800 | 6.20 | 2.34 | 2.30 |
| 1000 | 5.78 | 2.23 | 2.25 |
| 1250 | 5.53 | 2.19 | 2.15 |
| 1600 | 4.93 | 2.06 | 2.01 |
| 2000 | 4.57 | 1.93 | 1.93 |
| 2500 | 4.19 | 1.78 | 1.78 |
| 3150 | 3.77 | 1.68 | 1.66 |
| 4000 | 3.10 | 1.61 | 1.61 |
| 5000 | 2.56 | 1.59 | 1.57 |

Table 2

The test was performed in accordance with DIN EN ISO 354 (December 2003). The airborne sound excitation in the reverberation room was generated by a Dodekaeder as omnidirectional transmitter, which was set up in at least 2 different positions. The spatial averaging of the sound pressure level between 100 Hz and 5.000 Hz was performed with fixed microphone positions.

Using the method of interrupted noise, the reverberation time in the reverberation room was determined with and without absorptive material in accordance with DIN EN ISO 354 for at least 12 different combinations of loud-speaker and microphone positions. The sound absorption coefficient $\alpha_s$ is thus calculated in accordance with:

$$\alpha_s = 55.3 \cdot \frac{V}{S} \cdot \left(\frac{1}{c_2 T_2} - \frac{1}{c_1 T_1}\right) - 4 \cdot \frac{V}{S}(m_2 - m_1) \quad \text{Equation (1)}$$

Cf. DIN EN ISO 354, section 8 where
:

$T_1$: Reverberation time in the reverberation room [s]

$T_2$: Reverberation time in the reverberation room following installation of the test specimen [s]

$V$: Volume of the empty reverberation room [$m^3$]

$S$: Surface of the test specimen [$m^2$]

$c_1$ Sound velocity in air during measurement of $T_1$ [m/s]

$c_2$ Sound velocity in air during measurement of $T_2$ [m/s]

$m_1$ Air absorption coefficient, calculated according to ISO 9613-1, during measurement of $T_1$.

$m_2$ Air absorption coefficient, calculated according to ISO 9613-1, during measurement of $T_2$.

Air absorption occurs through the friction and resonance effects of the air molecules. This portion of sound absorption does not depend on the test specimen, but exclusively on temperature, air humidity and atmospheric air pressure. If differences result between the reference measurements in the empty reverberation room and a measurement of the test specimens, the difference of the respective portion of air absorption is mathematically corrected (cf. Equation 1). The calculation of the air absorption coefficient is performed following the procedure in ISO 9613, Part 1, June 1993 (/2/).

Air absorption is relevant beginning at a frequency of approx. 1000 Hz and increases towards higher frequencies. The portion of air absorption, and therefore any correction that may have been considered, ranges, where the differences in the above-mentioned parameters are not too great, from approx. +/−0.01 to +/−0.1 points.

The determination of the weighted sound absorption coefficient $\alpha_w$ derived from the frequency-dependent values of the sound absorption coefficient $\alpha_s$, serves as a simplified statement of an individual value.

For this, following the procedure in DIN EN ISO 11654 /3/, the third-octave values of the sound absorption coefficient $\alpha_s$ are converted into octave values $\alpha_{pi}$, the so-called "practical sound absorption coefficient." The reference curve in frequency range 250 Hz is defined up to 4 kHz and is in each case moved in steps of 0.05 until the sum of the most unfavorable deviation is smaller than or equals 0.10.

When the practical sound absorption coefficient $\alpha_{pi}$ exceeds the value of the moved reference curve in an octave center frequency by 0.25 or more, then, supplemental to the $\alpha_w$ value, one or more shape indicators need to be stated in parentheses. The following designations are used:

L: when a value is exceeded by 0.25 or more at f=250 Hz

M: when a value is exceeded by 0.25 or more at f=500 Hz or 1.000 Hz

H: when a value is exceeded by 0.25 or more at f=2.000 Hz or 4.000 Hz.

With the classification system given in DIN EN ISO 11654, the single number quantities of the weighted sound absorption coefficient $\alpha_w$ is divided into sound absorption classes, which are presented in the following table:

| Sound absorption class | $\alpha_w$ value |
|---|---|
| A | 0.90; 0.95; 1.00 |
| B | 0.80; 0.85 |
| C | 0.60; 0.65; 0.70; 0.75 |
| D | 0.30; 0.35; 0.40; 0.45; 0.50; 0.55 |
| E | 0.25; 0.20; 0.15 |
| Unclassified | 0.10; 0.05; 0.00 |

The measurements were taken in a reverberation room as shown in FIG. 13 with 6.31 m×5.94 m×5.79 m×6.41 m and height of the room ranging 4.86 m to 5.95 m at the four corners with a volume of 200 $m^3$ and surface area of 207 $m^2$. Four diffusers were suspended from the ceiling to obtain a sound field that is as diffuse as possible.

In summary, the first set up of the board panel with 19 mm thickness formed from two plywood boards sandwiching a layer of polyurethane with an open area surface area of 16% with 1.6 mm wide slots (without bending/curving of the board panel) tested for acoustic property with the board panel bent to form a 200 mm radius and placed in front of a cavity of 160-290 mm thickness with 100-150 mm of mineral wool insulation (more mineral wool where the cavity was larger), resulted in a weighted sound coefficient of 0.80 and "B" classification. FIG. 19A shows the overview of the tested specimen and 19B shows the result of the testing.

Acoustically Effective Surface:
Height (individual): 3.00 m
Width (individual): 4.00 m
Specimens in reverberation room: 1 pc.

Area of the test specimen: 12.00 m2
Volume: 200 m3
Total surface: 207 m2
Test method: Method using interrupted noise according to DIN EN ISO 354:2003
Test signal: Pink Noise
Receive filter: third octave
Setup of specimen in reverberation room: type E-290 in accordance with DIN EN ISO 354, no. B.4 empty/with specimen
Temperature: 21.4/22.0° C.
Air humidity: 49.5/45.5%
Air pressure: 100.6/100.8 kPa
Speed of sound: 344.18 m/s
ISO 9613

| Averaging in octaves: f in Hz | $\alpha_s$ |
|---|---|
| 125 | 0.69 |
| 250 | 0.78 |
| 500 | 0.76 |
| 1000 | 0.73 |
| 2000 | 0.80 |
| 4000 | 0.75 |

The second setup of the board panel with 19 mm thickness formed from two plywood boards sandwiching a layer of polyurethane with an open area surface area of 16% with 1.6 mm wide slots (without bending/curving of the board panel) tested for acoustic property with the board panel bent to form a 600 mm radius and placed in front of a cavity of 300-340 mm thickness with average of 150 mm of mineral wool insulation, resulted in a weighted sound coefficient of 0.75 and "C" classification. FIG. 20A shows the overview of the tested specimen and 20B shows the result of the testing.

| Averaging in octaves: f in Hz | $\alpha_s$ |
|---|---|
| 125 | 0.76 |
| 250 | 0.72 |
| 500 | 0.69 |
| 1000 | 0.74 |
| 2000 | 0.82 |
| 4000 | 0.79 |

As the result of the tests show, the board panel as described here show superior acoustic property of absorbing sound in addition to all other properties and qualities of the board panel.

The invention claimed is:
1. A board panel comprising:
a rectangular top of three or more stacked layers, wherein at least two layers are a hard material and at least one layer is a soft elastic pressure absorbing and sound absorbing material;
a front face layer and a back face layer are layers of a hard material in which slits are provided in parallel with a vertical side of said rectangular top;
said slits have a length of ½ to ¾ of said vertical side, and one end thereof touches the horizontal side of said rectangular top; and
said slits include one type in which one end thereof touches an upper horizontal side of said rectangular top, forming upper slits, and another type in which one end thereof touches a lower horizontal side of said rectangular top, forming lower slits,
said slits have a depth that do not penetrate through the board panel,
wherein said slits provided on the front face layer alternate between slits touching the upper horizontal side and slits touching the lower horizontal side of said rectangular top,
said slits provided on the back face layer alternate between slits touching the upper horizontal side and slits touching the lower horizontal side of said rectangular top, and
wherein said front face layer and said back face layer alternate between slits touching the upper horizontal side and the lower horizontal side.
2. The board panel as set forth in claim 1 wherein said slits are spaced 5 mm or more on the straight line connecting the middle points of said vertical sides while said slits are spaced 40 mm or less on said horizontal sides.
3. The board panel as set forth in claim 1 wherein said front face layer is a wood layer and said vertical side is in the direction of wood grain of the wood.
4. A board panel comprising:
a rectangular top with three or more stacked layers of a hard material and a soft elastic pressure absorbing and sound absorbing material; wherein
a first hard material layer is on a front face, a soft elastic pressure and sound absorbing material layer touches said first hard material layer; and a second hard material layer is more toward a rear face side than said middle soft elastic pressure absorbing and sound absorbing material layer;
layers other than said first hard material layer and the second hard material layer are soft elastic pressure absorbing and sound absorbing material layers;
slits are formed in parallel with a vertical side of said rectangle on said front face of said first hard material layer of said board panel, forming front face-side slits;
said front face-side slits have a length of ½ to ¾ of a length of said vertical side, and one end thereof touches a horizontal side of said rectangle while a depth thereof reaches said middle soft elastic pressure absorbing and sound absorbing material layer but does not reach said second hard material layer;
said two or more front face-side slits include a type in which one end thereof touches the upper horizontal side of said rectangular top, forming upper front face slits and another type in which one end thereof touches the lower horizontal side of said rectangular top, forming lower front face slits;
two or more slits that are in parallel with the vertical side of said rectangular top are provided on the rear face-side of said board panel, forming rear face-side slits;
said rear face-side slits have a length of ½ to ¾ of that of said vertical side, and one end thereof touches the horizontal side of said rectangular top while the depth thereof goes through said second hard material layer but does not reach said first hard material layer;
said two or more rear face-side slits include the type in which one end thereof touches the upper horizontal side of said rectangle, forming upper rear face slits, and the other type in which one end thereof touches the lower horizontal side of said rectangular top, forming lower rear face slits; and
said upper slits and lower slits are arranged alternately on said front face-side, said upper slits and lower slits are arranged alternately on said rear face-side, said front face-side slits and said rear face-side slits are arranged alternately, and said front face-side slits and said rear face-side slits have a depth that do not penetrate through the board panel.

5. The board panel as set forth in claim 4 wherein said front face-side slits and said rear face side-slits are spaced 5 mm or more on the straight line connecting the middle points of said vertical sides, and said front face side-slits and said rear face side-slits are spaced 40 mm or less on said horizontal side.

6. The board panel as set forth in claim 5 wherein said first hard material layer and said second hard material layer are wood layers, and said vertical sides thereof is in the direction of wood grain.

7. The board panel as set forth in claim 5 wherein said second hard material layer is the rear face layer.

8. The board panel as set forth in claim 5 further comprising a face between the front face and the rear face of said board panel wherein it does not contain any of said front face side-slits and said rear face side-slits between the tip of said front face side-slits and the tip of said rear face side-slits.

9. The board panel as set forth in claim 1 wherein the soft material layer is layer of foam material.

10. The board panel of claim 9 wherein the soft material is made of foam material with open cells.

11. The board panel of claim 10 wherein the soft material is a melamine foam.

12. The board panel of claim 10 wherein the soft material is polyurethane foam.

13. The board panel of claim 1 wherein the weighted sound absorption coefficient is at least 0.80.

14. The board panel of claim 10 where the open area formed by the slits range between 15% and 40% of surface area.

15. The board panel of claim 10 where tensile strength of the board panel is more than 75 kPa.

16. The board panel of claim 10 with density of the foam material is more than 90 kg/m3.

* * * * *